G. B. WIESTLING.
Dumping-Wagon.

No. 227,337.  Patented May 4, 1880.

WITNESSES:
O. Neveux
C. Sedgwick

INVENTOR:
G. B. Wiestling
BY Munn & Co
ATTORNEYS.

UNITED STATES PATENT OFFICE.

GEORGE B. WIESTLING, OF MONT ALTO, PENNSYLVANIA.

DUMPING-WAGON.

SPECIFICATION forming part of Letters Patent No. 227,337, dated May 4, 1880.

Application filed February 24, 1880.

*To all whom it may concern:*

Be it known that I, GEORGE B. WIESTLING, of Mont Alto, Franklin county, and State of Pennsylvania, have invented a new and useful Improvement in Safety-Catches for Dumping-Vehicles, of which the following is a specification.

Figure 1:
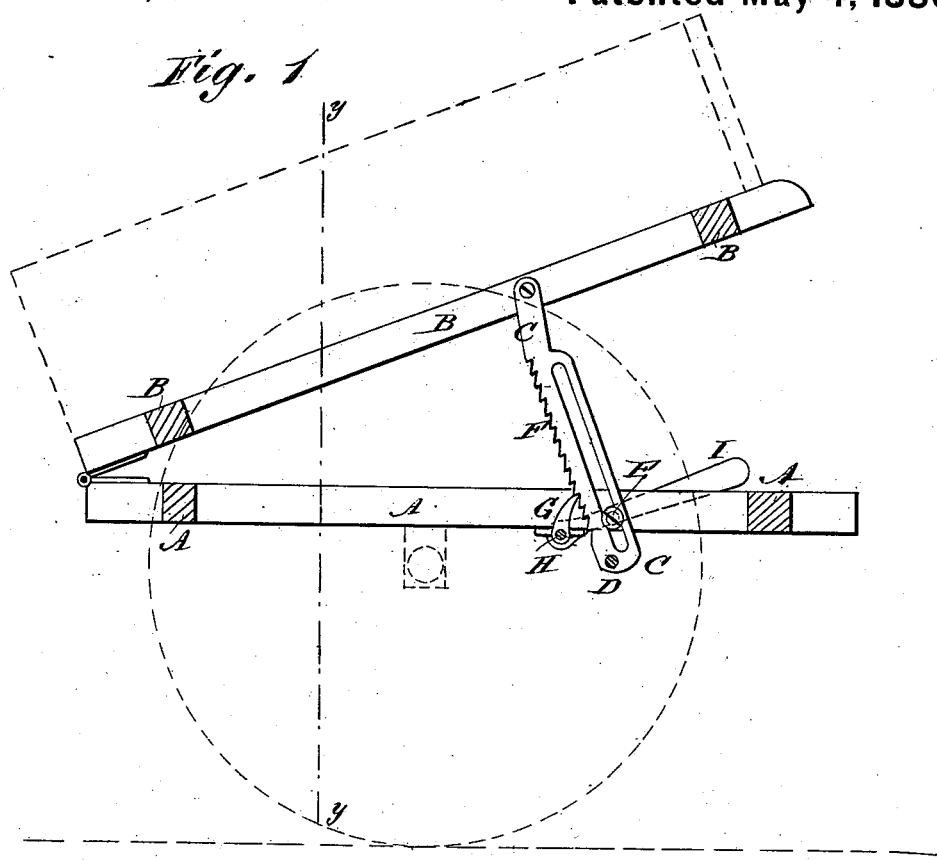
Figure 2:
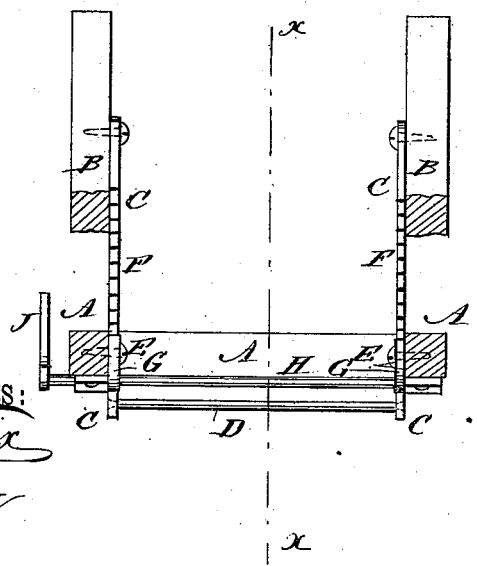

Figure 1 is a sectional side elevation of the improvement, taken through the line $x\,x$, Fig. 2; and Fig. 2 is a sectional end elevation taken through line $y\,y$, Fig. 1.

Similar letters of reference indicate corresponding parts.

The object of this invention is to furnish safety-catches for dumping carts, wagons, and other vehicles, so constructed as to hold the loaded bodies of the vehicles from dropping back should the hoisting mechanism break.

The invention consists in the combination, with the stationary frame and the movable frame of a dumping-vehicle, of toothed and slotted bars, guides, pawls, and lever, as will be hereinafter fully described.

A represents the lower or stationary frame of a dumping cart, wagon, or other vehicle, and B is the hinged or movable frame.

To the side bars of the movable frame B are pivoted the upper ends of two hanging bars, C, the lower ends of which are connected by a rod, D. The bars C are slotted longitudinally to receive screws, pins, or bolts E, attached to the side bars of the stationary frame A.

Upon the rear edges of the bars C are formed ratchet-teeth F, with which engage the pawls G, attached to the rod H. The rod H works in bearings attached to the side bars of the frame A. To one or both ends of the rod H is rigidly attached a lever, I, which is made sufficiently heavy to hold the pawls G against the ratchet-teeth F when the said lever is turned in one direction, and to hold the said pawls away from the said ratchet-teeth when turned in the other direction.

With this construction, when the wagon or cart body is to be raised in dumping the lever I is adjusted to hold the pawls G against the ratchet-teeth F, so that, should the hoisting mechanism break, the pawls G will engage with the ratchet-teeth F and hold the loaded body from dropping back, thus guarding against injury to the man, horse, or vehicle.

I am aware that it is not new to use a hinged frame with rack and ratchet-bar, which are engaged, respectively, by a pinion and pawl, or to use a pivoted bar notched in front and a bolt with slotted head and spring pawl or holder; but

What I claim as new and of my invention is—

The combination, with the frames A B, the latter hinged at the rear to the former, of the slotted rack-bars C, connected by rod D, the bolts E on frame A, the rod H, having pawls G, and the lever I, attached to said rod, as and for the purpose specified.

GEO. B. WIESTLING.

Witnesses:
JOHN A. KEPNER,
E. B. WIESTLING.